(12) United States Patent
Kruiskamp

(10) Patent No.: US 10,374,452 B2
(45) Date of Patent: Aug. 6, 2019

(54) POWER SAVING DEVICE

(71) Applicant: Dialog Semiconductor B.V., s-Hertogenbosch (NL)

(72) Inventor: Marinus Wilhelmus Kruiskamp, s-Hertogenbosch (NL)

(73) Assignee: Dialog Semiconductor B.V., 'S-Hertogenbosch (NL)

( * ) Notice: Subject to any disclaimer, the term of this patent is extended or adjusted under 35 U.S.C. 154(b) by 235 days.

(21) Appl. No.: 15/367,676

(22) Filed: Dec. 2, 2016

(65) Prior Publication Data

US 2017/0179758 A1    Jun. 22, 2017

(30) Foreign Application Priority Data

Dec. 21, 2015  (DE) .................. 10 2015 226 250

(51) Int. Cl.

| H02J 3/14 | (2006.01) |
|---|---|
| H02J 3/38 | (2006.01) |
| H02J 7/00 | (2006.01) |
| H02J 7/34 | (2006.01) |
| H02J 7/35 | (2006.01) |
| H02J 9/06 | (2006.01) |

(52) U.S. Cl.
CPC .............. *H02J 9/06* (2013.01); *H02J 3/14* (2013.01); *H02J 3/383* (2013.01); *H02J 7/345* (2013.01); *H02J 7/35* (2013.01); *H02J 2007/004* (2013.01)

(58) Field of Classification Search
CPC ........................................................ H02J 9/06
See application file for complete search history.

(56) References Cited

U.S. PATENT DOCUMENTS 5,739,596 A * 4/1998 Takizawa ............... G06F 1/263
                                                                      307/64
2010/0109931 A1    5/2010 Esnard et al.

FOREIGN PATENT DOCUMENTS

| DE | 199 34 708 | 2/2001 |
|---|---|---|
| DE | 20 2004 012 389 | 9/2004 |
| DE | 20 2004 012 389 | 11/2004 |

(Continued)

OTHER PUBLICATIONS

German Office Action, File No. 10 2015 226 250.0, Applicant: Dialog Semiconductor B.V., dated Nov. 20, 2017, 5 pgs, and English language translation, 6 pgs.

*Primary Examiner* — Jeffrey M Shin
(74) *Attorney, Agent, or Firm* — Saile Ackerman LLC; Stephen B. Ackerman

(57) ABSTRACT

A circuit for controlling a power supply is disclosed. The circuit has a storage element for storing energy harvested from energy sources, a backup battery, and a comparator to compare a voltage of the storage element to a reference voltage. The circuit also contains a first switch for selectively connecting the storage element to an output. A second switch connects the backup battery to the output. A switch control circuit controls the first switch to disconnect the storage element from the output and the second switch to connect the backup battery to the output, if the voltage of the storage element is below the reference voltage. The backup battery is disconnected from the output while the voltage of the storage element is below the reference voltage. The control circuit controls the second switch to disconnect the battery from the output while the voltage of the storage element is below the reference.

16 Claims, 4 Drawing Sheets

(56) References Cited

FOREIGN PATENT DOCUMENTS

DE    10 2012 112 825    6/2013
EP            1 575 177    9/2005

* cited by examiner

POWER SAVING DEVICE

TECHNICAL FIELD

The invention relates to a power saving device. The invention further relates to an automatic power multiplexer for backup battery in energy harvester applications with limited on-time.

BACKGROUND

Low-power devices can be equipped with a power supply that converts an external source of energy into electric power. For example, a solar cell (or photovoltaic, PV, cell), a thermo-electrical generator, or a dynamo can be used for this purpose. The device can also be equipped with an energy harvesting controller that controls how the electric energy is collected from the power supply. Since the amount of energy provided by the external source of energy may be not be continuously sufficient to supply the demand of the device, the harvesting controller can be configured to store the harvested energy in a storage element. A backup battery can be provided in addition to the storage element, to take over power supply when the storage element is empty. The controller may thus be configured so that a storage element (such as a capacitor or rechargeable battery) is charged from one or more alternative energy sources, such as a PV-cell. As soon as the voltage of the storage element is high enough, the storage element is connected to the output by the controller (herein, the output is the actual application that consumes the generated electric power: for instance a Bluetooth-LE transceiver). The backup battery complements the storage element in small, low-power, applications.

During longer periods without available power from the alternative energy source(s), the storage element will be drained by the load and will eventually become too low in voltage to properly supply the load. Before this happens, the controller disconnects the output from the storage element and connects the output to a backup-battery, which may be a non-rechargeable battery. This ensures that the load is properly supplied under all conditions.

FIG. 1 illustrates an example power supply circuit. The circuit comprises an alternative energy supply 1, such as a photovoltaic cell, which is connected to a storage element 2 for storing the energy harvested from the alternative energy supply 1. The circuit also comprises a backup battery 3, and a load 4. The load 4 is a circuit that can consume the energy from the alternative energy supply 1, the storage element 2, and the backup battery 3. To this end, the load 4 is connected to output terminal 13 of the power supply circuit. If the alternative energy supply 1 and/or the storage element 2 have sufficient voltage, then switch 8 connects these sources 1,2 to the output terminal 13, and thus to the load 4. Otherwise, switch 9 connects the backup battery 3 to the output terminal 13. This is accomplished by the power supply circuit comprising comparator 5, inverting amplifier 6, amplifier 7, and switches 8 and 9. The charger 11 forms an interface between the alternative energy supply 1 and the storage element 2. The charger can be implemented as a DCDC converter, for example.

The above information is presented as background information only to assist with an understanding of the present disclosure. No determination has been made, and no assertion is made, as to whether any of the above might be applicable as prior art with regard to the present invention.

SUMMARY

According to an aspect of the invention, a circuit is provided for controlling a power supply, the circuit comprising
a storage element for storing energy harvested from an energy source (201);
a backup battery;
a first switch for selectively connecting the storage element to an output;
a second switch for selectively connecting the backup battery to the output; and
a switch control circuit comprising a voltage monitor;
wherein the voltage monitor is configured to compare a voltage of the storage element to a reference voltage; and
wherein the switch control circuit is configured to:
control the first switch to disconnect the storage element from the output and the second switch to connect the backup battery to the output, if the voltage of the storage element is below the reference voltage;
decide whether to disconnect the backup battery from the output while the voltage of the storage element is below the reference voltage; and
control the second switch to disconnect the backup battery from the output while the voltage of the storage element is below the reference voltage, according to the decision.

The backup battery may be automatically disconnected from the output, even when sufficient energy is not available in the storage element. This will prevent the backup battery from being drained unnecessarily in cases when an apparatus is not used for a longer period. Still, the backup battery will be able to bridge shorter periods of energy deficiency. Thus, the lifetime of the backup battery before it is empty, is increased.

The switch control circuit may comprise a timer and may be configured to control the second switch to disconnect the backup battery from the output if the backup battery has been connected to the output for more than a reference time duration. This prevents draining the backup battery, because the backup battery is not used longer than the reference time duration.

The switch control circuit may comprise a terminal for receiving a signal input and is configured to decide to disconnect the backup battery if the terminal receives a predetermined signal at the terminal. This allows the backup battery to be disconnected, for example, after the application has performed certain shutdown operations.

The terminal may be configured to receive the predetermined signal from a circuit that is powered by the output. This allows the circuit that is powered to determine whether the power from the backup battery is still needed.

The switch control circuit may be further configured to detect, after having disconnected the backup battery from the output, whether the storage element is being charged by the energy source, and if the storage element is being charged by the energy source, connect the backup battery to the output. This way, the power is made available more quickly after the energy source starts to provide energy.

The switch control circuit may be further configured to, if the voltage of the storage element is above a further reference value, reconnect the storage element to the output and disconnect the backup battery from the output. This way, the normal operation of the power supply is restored.

The backup battery may be a non-rechargeable battery. Since the backup battery is not used very much, the non-rechargeable battery may have a long lifetime before it is drained.

According to another aspect of the invention, a method is performed by a circuit, the circuit comprising a storage element, a backup battery, a voltage monitor, a first switch, a second switch, and a switch control circuit, the method comprising storing energy harvested from an energy source by the storage element; comparing a voltage of the storage element to a reference voltage by the voltage monitor;
a first switch for selectively connecting the storage element to the output;
a second switch for selectively connecting the backup battery to the output;
in response to the voltage monitor detecting that the voltage of the storage element is below a reference voltage, controlling, by the switch control circuit, the first switch to disconnect the storage element from the output and the second switch to connect the backup battery to the output;
deciding, by the switch control circuit, whether to disconnect the backup battery while the voltage of the storage element is below the reference voltage; and
controlling, by the switch control circuit, the second switch to disconnect the backup battery from the output while the voltage of the storage element is below the reference voltage, according to the decision.

The person skilled in the art will understand that the features described above may be combined in any way deemed useful. Moreover, modifications and variations described in respect of the system may likewise be applied to the method and to the computer program product, and modifications and variations described in respect of the method may likewise be applied to the system and to the computer program product.

BRIEF DESCRIPTION OF THE DRAWINGS

In the following, aspects of the invention will be elucidated by means of examples, with reference to the drawings. The drawings are diagrammatic and may not be drawn to scale.

DESCRIPTION

Figure 1:
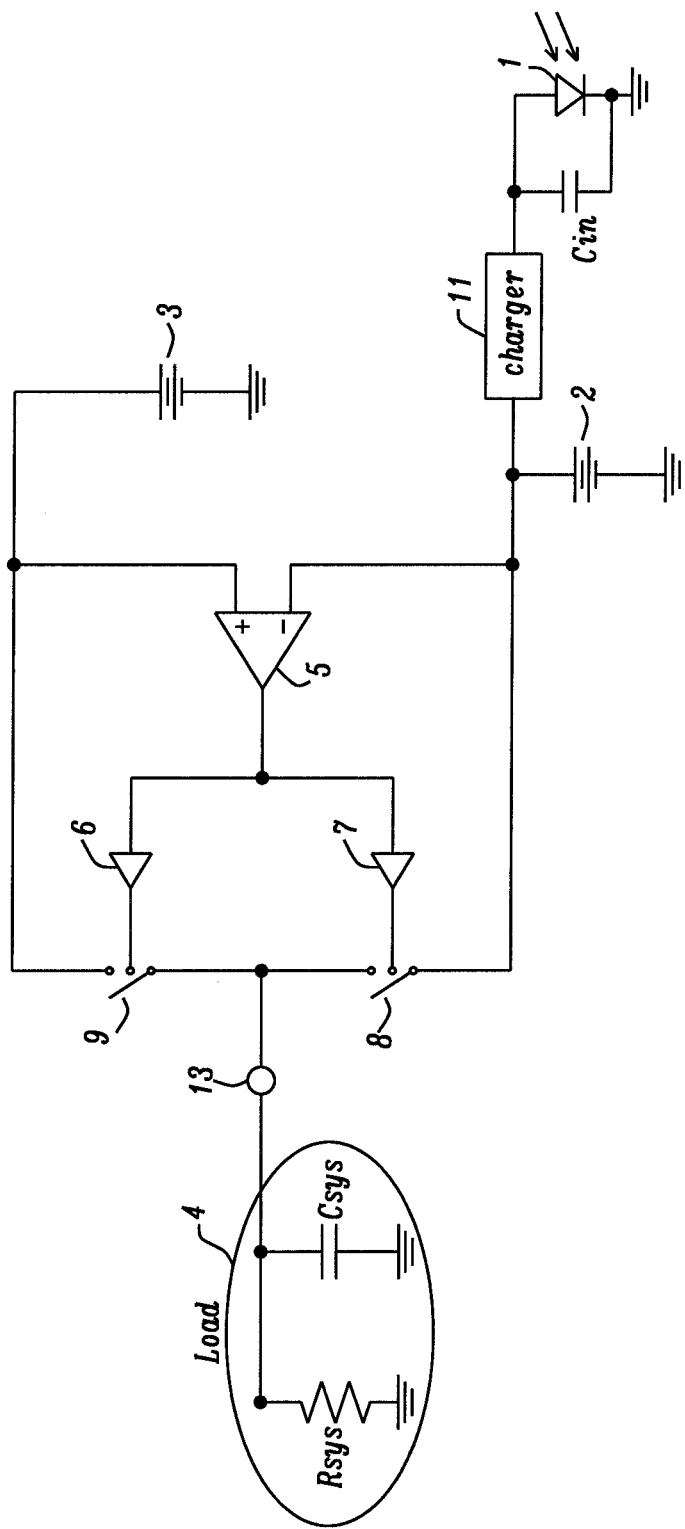
FIG. 1 shows a diagram of a power supply circuit including an external energy source and a backup battery (prior art).

Aspects of the invention address situations in which there is no power available from an alternative energy source, and without need to supply the load (and therefore no need to drain the backup battery). An example of this situation is a device which is on a shelf in the dark in a shop for several months. If the device is, for example, powered by a photovoltaic cell, the storage element is not filled as long as the solar cell is kept in the dark. If the backup battery is connected to the load for that entire period, the non-rechargeable backup battery will drain and might even be empty before the product is sold.

Another example is a cycle computer or a speed-measurement sensor attached to a racing bicycle. For example, the cycle computer might be powered by movement of the bicycle or by a photovoltaic cell. If the bicycle is not used during the winter (and the device is not able to harvest energy from the sun or from movement during that time), it may be undesirable that the device keeps running on (and draining) the non-rechargeable battery.

According to an aspect, a multiplexer may be provided, which can connect the load to either a storage element or a backup battery. A means may be provided to detect if the voltage of the storage-element is sufficient to supply the load. Further, a means to disconnect the backup-battery from the output, although the storage-element is not sufficient to supply the load, is provided. The disconnection can be controlled, for example, by means of a timer that limits the duration of the backup battery being connected to the output. The timer is reset as soon as the output is connected to the storage-element. Alternatively, the application (the load, which is powered by the output of the multiplexer) decides whether the backup-battery can be disconnected. This can be realized by means of a user interaction (button press), or an autonomous decision by the application (when the application is smart enough to figure out by itself that it can be switched off). Such an autonomous decision might be made by a software program executed as part of the application.

An energy harvesting solution may be provided with a backup battery, of which the backup battery is only connected to the output during a limited amount of time after the voltage of the storage element has dropped below its normal operation voltage.

In certain embodiments, there is ON/OFF switch that is operable by a user in order to prevent that the backup battery is being depleted during longer periods of inactivity. In certain embodiments, the backup battery may be pre-installed in the device, because drainage of the backup battery before its first sale may be prevented by the switch controls described herein. In such a case, the battery can be placed in the product during manufacturing. In certain embodiments, since the use of the backup battery is limited, the backup battery may typically last as long as the product lifetime, or longer. This makes it possible to seal the product, and may remove the need to allow the battery compartment to be opened by the user. This can make manufacturing cheaper and can make the product more robust and/or water resistant.

In certain embodiments, an energy harvester with backup battery is provided. Moreover, a multiplexer is provided which connects either the storage-element or the backup battery to the output. Herein, the maximum duration of the backup battery being connected to the output is limited to a certain value. If that time expires (and the voltage provided by the storage element is still not sufficient), the output will be floating until the voltage provided by the storage element is sufficient to supply the load. A simple timer can be implemented, for example a counter, to provide a signal when the maximum duration has expired. The counter may be reset to zero when the storage element is disconnected from the output, and periodically increased. The counter value may be compared to a reference value by a comparator to generate a signal to the relevant multiplexer when the counter value exceeds the reference value.

In the above described system, the storage element may need to be charged up to a certain degree before the output will be connected to the storage element. With a fully depleted storage element, this can take quite some time. As an example, consider the cycle speed measurement on a bicycle that has been in the garage during the winter. If you then take the bicycle for a ride, it can take some time for the storage battery being charged enough for the application to operate. But the fact that the storage battery is being charged is a good indication that the bicycle is being used and that the storage battery will be filled soon. So it should be better to already enable the application (on the backup battery).

In view of this, in certain embodiments, the backup battery is connected to the output when the alternative energy source is charging the storage element, but voltage is not yet sufficient to supply the load. This may be detected by means of a signal generated by an energy harvester. Energy harvester circuits are known in the art per se. The output will then be supplied with power whenever alternative energy is available (regardless of whether the energy generated by the alternative energy source is already sufficient to power the application connected to the output or not), and will be disconnected when there is no alternative energy available for a longer period of time.

In certain embodiments, the signal indicating that the charger is charging and that the backup battery should thus be connected to the output keeps active until the charger is not charging anymore for a longer period of time (this is to prevent that the backup switch is opened/closed many times when the alternative energy is not a constant, but a pulsed source).

In certain embodiments, an extra input is added to the OR from a user action (for instance a button-press). In this way the user can overrule the decision to keep the application off.

Figure 2:
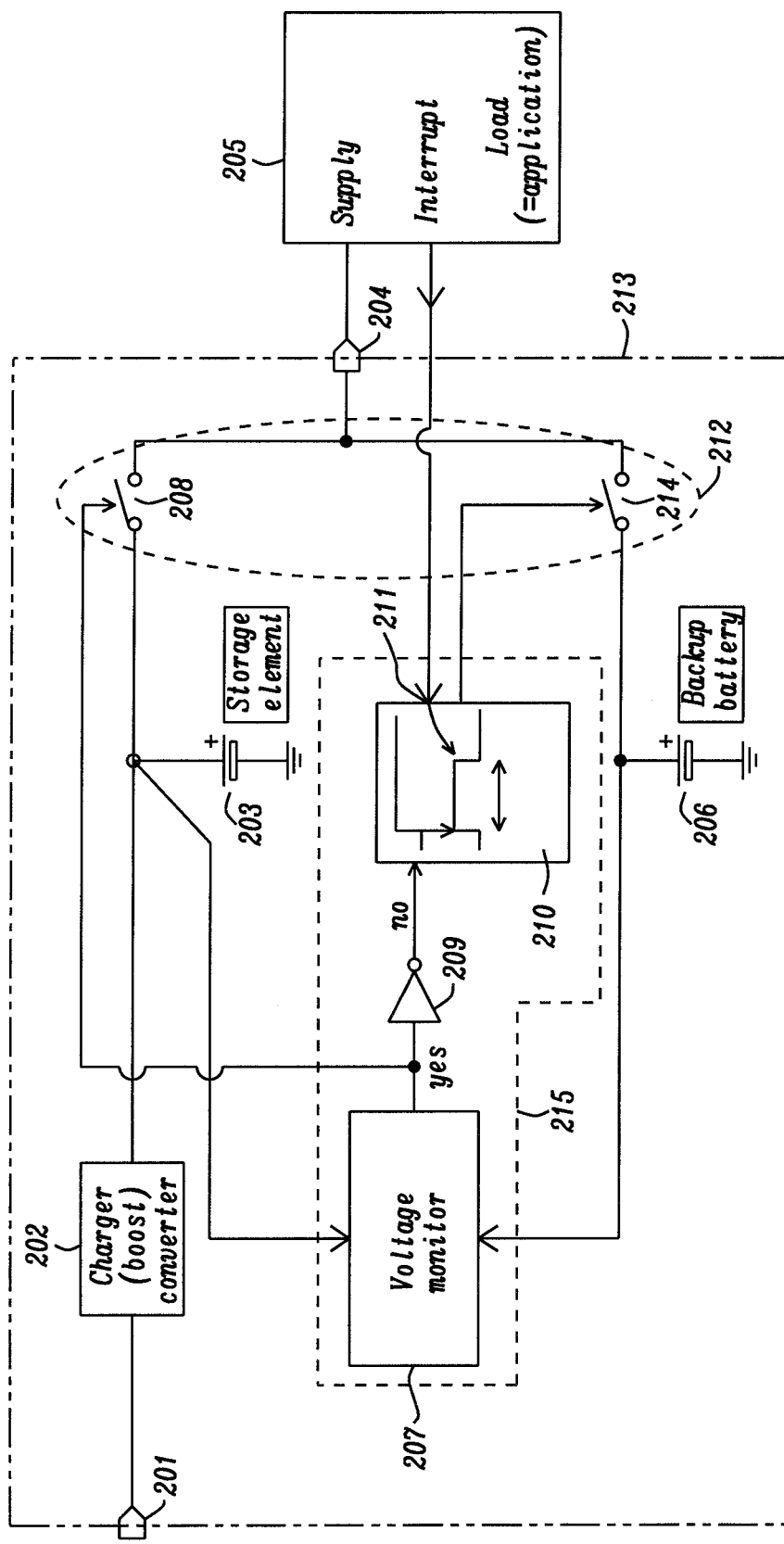
FIG. 2 shows a diagram of a power supply circuit

FIG. 2 illustrates a power supply circuit 213 including a backup battery 206. An input terminal 201 is provided for connecting to a source of external energy. For example, the source of external energy may comprise a photovoltaic cell, a dynamo, a thermoelectric element, and/or another component that converts external energy into electric energy. The input terminal 201 connects to an optional charger or boost-converter 202, which may be provided for harvesting the energy efficiently. The alternative energy source is connected, via the input terminal 201 and the optional charger or boost-converter 202, to a storage element 203. The storage element 203 can be any rechargeable deposit for electric energy, such as a rechargeable battery or a capacitor. The storage element 203 may also have a ground terminal. The storage element 203 is further connected to an output terminal 204 via a switch 208 of a multiplexer 212. The output terminal 204 may be connected to a load 205. The load 205 comprises electric components of an application (not shown) that consumes the power supplied by the power supply circuit 213.

The power supply circuit 213 further comprises a backup battery 206. The backup battery may be any deposit for electric energy, such as a rechargeable battery or a non-rechargeable battery. In certain embodiments, the backup battery 206 may be designed to preserve energy for a longer duration of time than the storage element 203.

The power supply circuit 213 further comprises a voltage monitor block 207. The voltage monitor block 207 represents electric components that monitor the voltage over the storage element 203, and compare the measured voltage with a reference voltage. The voltage monitor block 207 may thus comprise a comparator and a circuit that generates the reference voltage. In certain embodiments, the reference voltage is a predetermined voltage. The predetermined voltage may be a design parameter selected with regard to the requirements of the load 205. Alternatively, the reference voltage may be based on the voltage over the backup battery 206.

In certain embodiments, the voltage monitor block 207 comprises a comparator with an optional hysteresis that compares V(STORAGE), the voltage over the storage element 203, and V(BACKUP), the voltage over the backup battery 206. In pseudo code, which is reproduced here as an illustrative example, this comparison may be implemented as follows:

```
IF V(STORAGE) > V(BACKUP) + hyst1
  THEN signal := yes
  ELSE IF V(STORAGE) < V(BACKUP) - hyst2
    THEN signal := no
    ELSE signal will stay unchanged.
```

In the above pseudocode, hyst1 and hyst2 are constants.

In certain alternative embodiments, the voltage monitor block 207 can be implemented by means of two comparators that look at the absolute voltage of STORAGE and BACKUP. In pseudo code, which is reproduced here as an illustrative example, this comparison may be implemented as follows:

```
IF V(STORAGE) > threshold1
  THEN storage_ok := yes
  ELSE IF V(STORAGE) < threshold2
    THEN storage_ok := no
    ELSE storage_ok will stay unchanged;
IF V(BACKUP) > threshold3
  THEN backup_ok := yes
  ELSE IF V(BACKUP) < threshold4
    THEN backup_ok := no
    ELSE backup_ok will stay unchanged;
signal := (storage_ok = no) AND (backup_ok = yes).
```

In the above pseudocode, threshold1, threshold2, threshold3, and threshold4 are constant values, wherein threshold1>threshold2 and threshold3>threshold4.

In certain embodiments, the voltage monitor block 207 can be implemented by means of a comparator that looks at the absolute voltage of STORAGE (without considering V(BACKUP)). In pseudo code, which is reproduced here as an illustrative example, this comparison may be implemented as follows:

```
IF V(STORAGE) > threshold1
  THEN signal := no
  ELSE IF V(STORAGE) < threshold2
    THEN signal := yes
    ELSE signal will stay unchanged.
```

In the above pseudocode, threshold1 and threshold2 are constant values, wherein threshold1>threshold2.

The above-mentioned pseudocode may be implemented by means of electric components in a manner known to the person skilled in the art. Alternatively, a microprocessor may be used to implement the pseudocode by means of a computer program. The symbol "signal" in the above pseudocode examples denotes the output signal generated by the voltage monitor 207. Referring to FIG. 2, that signal is provided to the first switch 208 and via the inverter 209 to backup control block 210. If the signal is "yes", the first switch 208 closes and if the signal is "no", the first switch 208 opens.

In certain embodiments, as long as the voltage over the storage element 203 is above the reference value, the voltage monitor 207 controls the first switch 208 of the multiplexer 212 to connect the storage element 203 to the output terminal 204. This can be done by means of a suitable signal, as is known in the art by itself. Also, the signal is transmitted via an optional inverter 209 to a backup control block 210. The backup control block 210 controls the second switch 214. When the voltage monitor 207 sends the signal indicating that the voltage over the storage element 203 is below the reference voltage, then the backup control block 210 sends a signal to the second switch to connect the backup battery 206 to the output terminal 204 (and thus to the load 205). Also, the backup control block 210 then starts a timer. While the timer is running, the backup control block 210 checks the signal that is received from the voltage monitor 207.

While the storage element 203 is disconnected from the output terminal 204, the voltage monitor 207 compares the voltage over the storage element 203 to a further reference voltage. For example, the further reference voltage may be the same as the reference voltage. Alternatively, the further reference voltage may be higher than the reference voltage. When the voltage monitor 207 detects that the voltage over the storage element 203 is higher than the further reference voltage, the voltage monitor sends a signal to the first switch 208 to connect the storage element 203 to the output terminal 204 and sends a signal to the backup control block 210.

If the backup control block 210 receives the signal indicating that the voltage over the storage element 203 is above a further reference voltage, then the backup control block 210 sends a signal to the second switch 214 to disconnect the backup battery 206 from the output terminal 204. Moreover, when the backup control block 210 detects that the timer has been running for a reference time duration, the backup control block 210 also sends the signal to the second switch 214 to disconnect the backup battery 206 from the output terminal 204. The timer of the backup control block 210 may be implemented, for example, by means of a counter which is incremented at a frequency determined by an oscillator. Alternatively, the timer may be implemented by means of a capacitor and a resistor. Such timers are widely known and not described in greater detail herein.

Optionally, the backup control block 210 may comprise an input terminal 211. This input terminal may be connected to any external circuit, in particular to the load 205 that is powered by the output terminal 204. When the backup control block 210 receives a suitable signal through its input terminal, the backup control block 210 also disconnects the backup battery 206 from the output terminal 204.

Hereinafter, the voltage monitor 207 and the backup control block 210 may be collectively denoted by switch control circuit 215. It is observed that the functionality of the switch control circuit 215 may alternatively be implemented by means of a microcontroller.

In an alternative embodiment in accordance with FIG. 2, the backup control block 210 comprises the input terminal 211, but does not comprise a timer. Thus, the functionality of the timer is replaced by the input terminal 211. When the backup control block 210 receives a suitable signal through its input terminal, the backup control block 210 disconnects the backup battery 206 from the output terminal 204. However, the backup control block 210 does not keep track of how long the backup battery is connected. Such timing functionality may alternatively be implemented in the load 205, which may generate the signal at the input terminal 211 in dependence on such a timer. Alternatively, the load 205 may determine in another way (determined by the particular application) when to send the signal to disconnect the backup battery.

Figure 3:
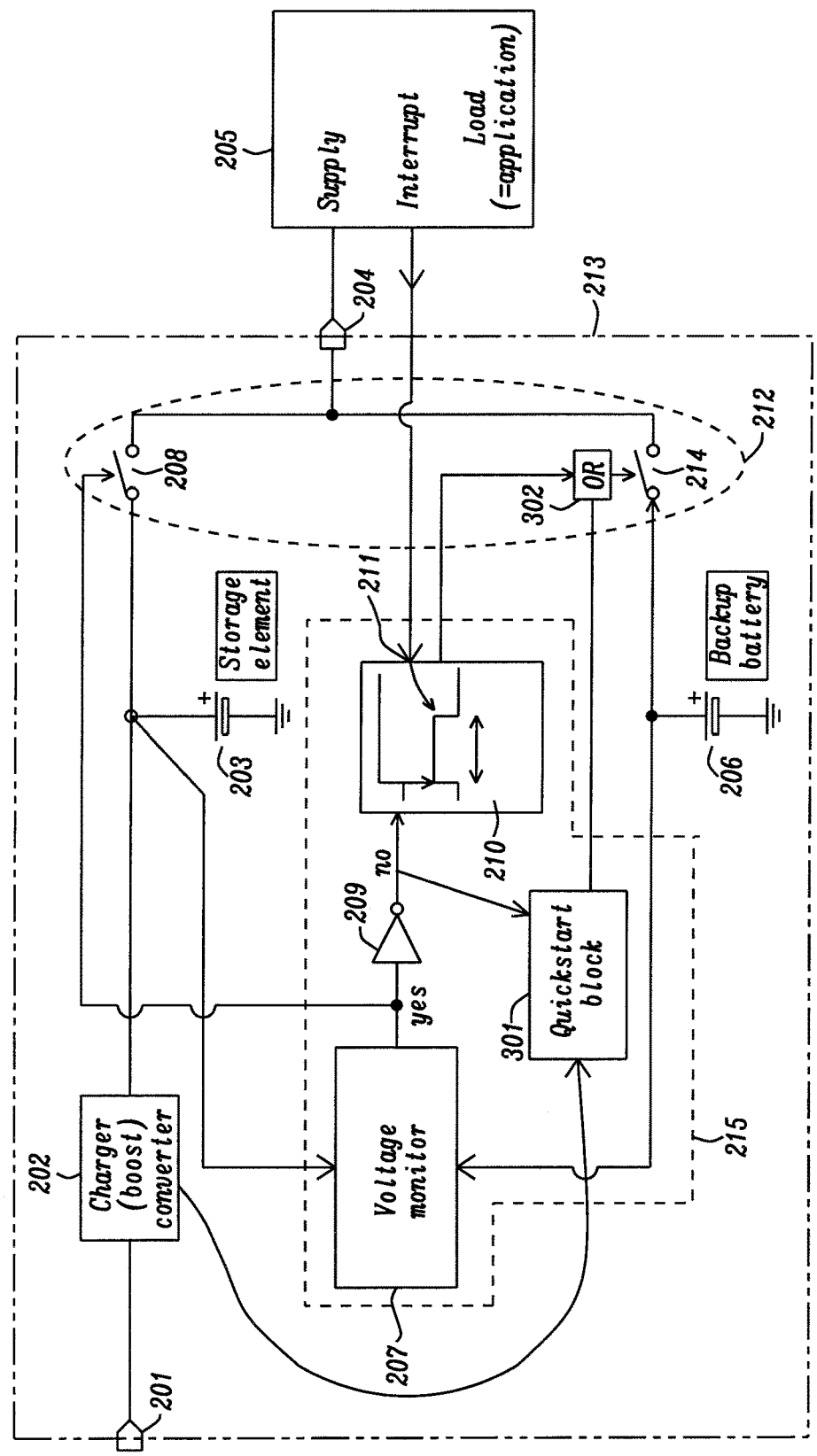
FIG. 3 shows a diagram of an alternative power supply circuit.

FIG. 3 illustrates an alternative embodiment of the power supply circuit. The alternative embodiments can be implemented with the same blocks as FIG. 2, and with the corresponding varieties and modifications thereof. The similar items have been denoted by the same reference numerals and are not described again.

The embodiment of FIG. 3 comprises a 'quickstart block' 301. The quickstart block 301 helps to start up the load quickly after the external energy source has become active, even before the storage element 203 has been properly charged. The charger or boost-converter 202 is configured to generate a signal when it starts receiving charge at the input terminal 201. This signal is sent to the quickstart block. The quickstart block also receives a signal from the voltage monitor 207. When the quickstart block determines, based on the signals it receives, that the external energy source has become active while the voltage over the storage element 203 is below the appropriate reference voltage, then the quick start block 301 sends a control signal to the second switch 214 to connect the backup battery 206 to the output terminal 204. OR block 302 is provided to control that the second switch is closed whenever and as long as any of the backup control block 210 or the quickstart block 301 sends a signal indicating that it should be closed. When both the backup control block 210 and the quickstart block 301 send a signal indicating that the second switch 214 should be open, the OR block sends a control signal to the second switch 214 to open. In certain embodiments, the quickstart block may be implemented by means of a simple AND port, for example making use of inverter 209. In alternative embodiments, the quickstart block 301 and the OR block 302 may be implemented by means of the optional microcontroller.

Figure 4:
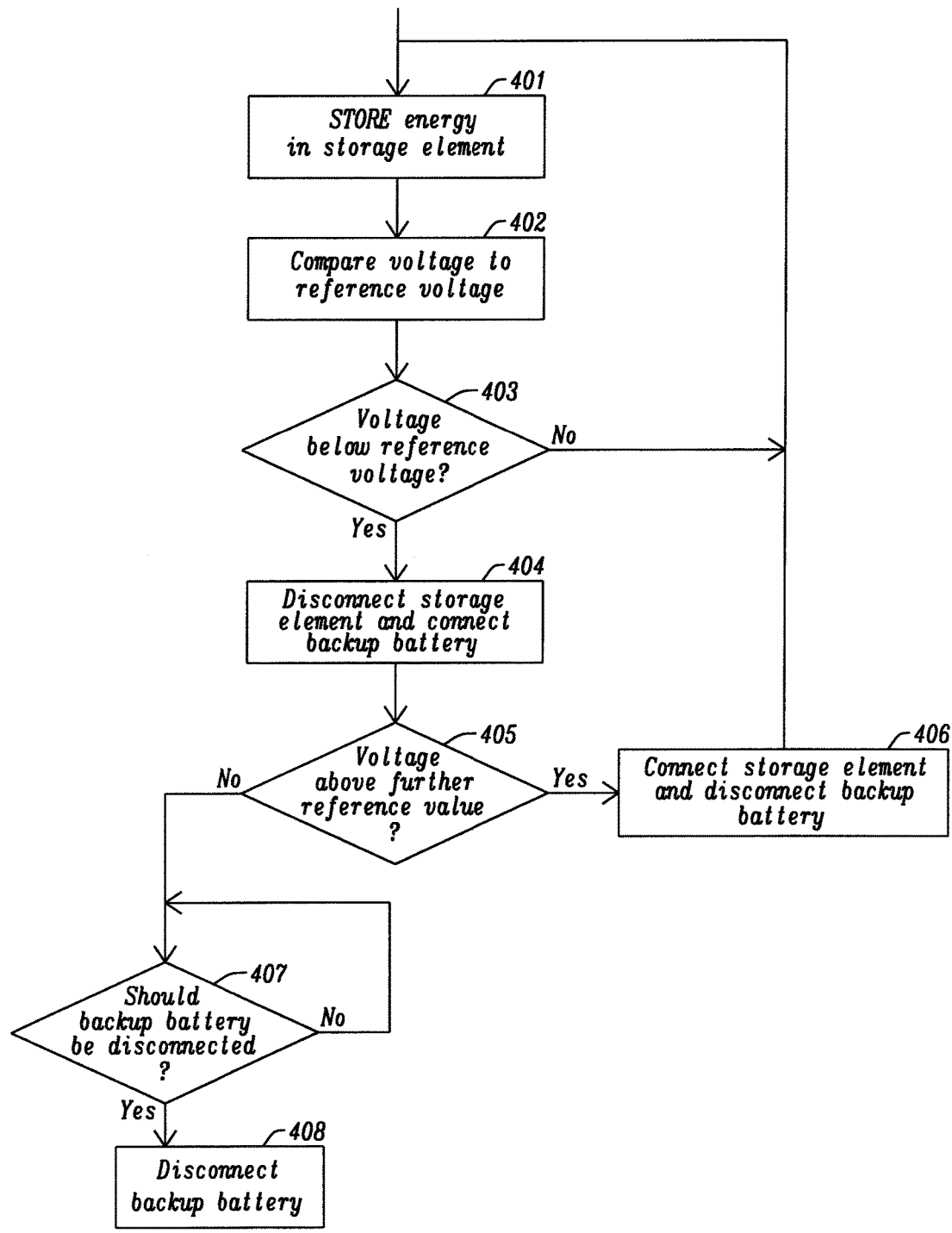
FIG. 4 shows a flowchart of a method of supplying power.

FIG. 4 illustrates a method performed by a power supply circuit. In step 401, energy from an external source is stored in a storage element 401. In step 402, the voltage over the storage element is compared with a reference voltage by a comparator. In step 403, it is checked if the voltage is below the reference voltage. If not, the method continues from step 401.

If yes, in step 404, the storage element is disconnected from an output terminal and a backup battery is connected to the output terminal. In step 405, it is checked whether the voltage over the storage element is above a further reference value. If yes, in step 406 the storage element is connected to the output terminal and the backup battery is disconnected from the output terminal, and the process continues from step 401.

If no, it is checked in step 407 whether the backup battery should be disconnected. If not, the process continues from step 405. If yes, the backup battery is disconnected from the output terminal in step 408.

An example of a circuit for controlling a power supply comprises a storage element for storing energy harvested from an energy source;

a backup battery;

a voltage monitor configured to compare a voltage of the storage element to a reference voltage;

a first switch for selectively connecting the storage element to a output;

a second switch for selectively connecting the backup battery to the output;

a switch control circuit for:

controlling the first switch to disconnect the storage element from the output and the second switch to connect the backup battery to the output, if the voltage of the storage element is below the reference voltage;

deciding whether to disconnect the backup battery while the voltage of the storage element is below the reference voltage; and controlling the second switch to disconnect the backup battery from the output while the voltage of the storage element is below the reference voltage, according to the decision.

The examples and embodiments described herein serve to illustrate rather than limit the invention. The person skilled in the art will be able to design alternative embodiments without departing from the scope of the claims. Reference signs placed in parentheses in the claims shall not be interpreted to limit the scope of the claims. Items described as separate entities in the claims or the description may be implemented as a single hardware or software item combining the features of the items described.

What is claimed is:

1. A circuit for controlling a power supply, comprising
   a storage element for storing energy harvested from an energy source;
   a backup battery;
   a first switch for selectively connecting the storage element to an output;
   a second switch for selectively connecting the backup battery to the output; and
   a switch control circuit comprising a voltage monitor;
   wherein the voltage monitor is configured to compare a voltage of the storage element to a reference voltage; and
   wherein the switch control circuit is configured to:
   control the first switch to disconnect the storage element from the output and the second switch to connect the backup battery to the output, if the voltage of the storage element is below the reference voltage;
   decide whether to disconnect the backup battery from the output while the voltage of the storage element is below the reference voltage; and
   control the second switch to disconnect the backup battery from the output while the voltage of the storage element is below the reference voltage, according to the decision, wherein the switch control circuit comprises a timer and is configured to control the second switch to disconnect the backup battery from the output if the backup battery has been connected to the output for more than a reference time duration.

2. The circuit of claim 1, wherein the switch control circuit comprises a terminal for receiving a signal input and is configured to decide to disconnect the backup battery from the output if the terminal receives a predetermined signal at the terminal.

3. The circuit of claim 2, wherein the terminal is configured to receive the predetermined signal from a circuit that is powered by the output.

4. The circuit of claim 1, wherein the switch control circuit is further configured to detect, after having disconnected the backup battery from the output, whether the storage element is being charged by the energy source, and if the storage element is being charged by the energy source, connect the backup battery to the output.

5. The circuit of claim 1, wherein the switch control circuit is further configured to, if the voltage of the storage element is above a further reference value, reconnect the storage element to the output and disconnect the backup battery from the output.

6. The circuit of claim 1, wherein the voltage monitor is configured to determine the reference voltage based on a voltage of the backup battery.

7. The circuit of claim 1, wherein the reference voltage has a predetermined fixed value.

8. The circuit of claim 1, wherein the backup battery is a non-rechargeable battery.

9. A method performed by a circuit, the circuit comprising a storage element, a backup battery, a voltage monitor, a first switch, a second switch, and a switch control circuit, the method comprising
   storing energy harvested from an energy source by the storage element;
   comparing a voltage of the storage element to a reference voltage by the voltage monitor;
   in response to the voltage monitor detecting that the voltage of the storage element is below a reference voltage, controlling, by the switch control circuit, the first switch to disconnect the storage element from the output and the second switch to connect the backup battery to the output;
   deciding, by the switch control circuit, whether to disconnect the backup battery while the voltage of the storage element is below the reference voltage; and
   controlling, by the switch control circuit, the second switch to disconnect the backup battery from the output while the voltage of the storage element is below the reference voltage, according to the decision,
   wherein the switch control circuit comprises a timer to control the second switch to disconnect the backup battery from the output if the backup battery has been connected to the output for more than a reference time duration.

10. The method of claim 9, wherein the switch control circuit comprises a terminal for receiving a signal input to decide to disconnect the backup battery from the output if the terminal receives a predetermined signal at the terminal.

11. The method of claim 10, wherein the terminal receives the predetermined signal from a circuit that is powered by the output.

12. The method of claim 9, wherein the switch control circuit detects, after having disconnected the backup battery from the output, whether the storage element is being charged by the energy source, and if the storage element is being charged by the energy source, connect the backup battery to the output.

13. The method of claim 9, wherein the switch control circuit reconnects the storage element to the output and disconnect the backup battery from the output, if the voltage of the storage element is above a further reference value.

14. The method of claim 9, wherein the voltage monitor determines the reference voltage based on a voltage of the backup battery.

15. The method of claim 9, wherein the reference voltage has a predetermined fixed value.

16. The method of claim 9, wherein the backup battery is a non-rechargeable battery.

* * * * *